United States Patent
Watanabe et al.

(10) Patent No.: US 8,113,014 B2
(45) Date of Patent: Feb. 14, 2012

(54) METHOD OF MANUFACTURING GLASS SUBSTRATE FOR RECORDING MEDIUM, GLASS SUBSTRATE FOR RECORDING MEDIUM, RECORDING MEDIUM AND HOLDING JIG

(75) Inventors: Toru Watanabe, Sakai (JP); Kenichi Sasaki, Osaka (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/312,799

(22) PCT Filed: Nov. 8, 2007

(86) PCT No.: PCT/JP2007/071709
§ 371 (c)(1),
(2), (4) Date: Nov. 19, 2009

(87) PCT Pub. No.: WO2008/068997
PCT Pub. Date: Jun. 12, 2008

(65) Prior Publication Data
US 2010/0062284 A1    Mar. 11, 2010

(30) Foreign Application Priority Data
Dec. 4, 2006   (JP) .................. 2006-326933

(51) Int. Cl.
  *G11B 5/62*  (2006.01)
  *C03C 17/22*  (2006.01)
  *B23Q 3/00*  (2006.01)
  *B32B 3/00*  (2006.01)
  *B05D 3/02*  (2006.01)

(52) U.S. Cl. ............. 65/30.14; 427/127; 428/848.8; 414/788; 118/502; 269/38

(58) Field of Classification Search ............. 427/301.1, 427/443.2, 372.2, 301, 127, 129; 118/502, 118/503; 269/37, 38, 40, 4, 42, 43, 329, 269/289 R, 165, 287; 414/788; 428/847.5, 428/848.8; 29/559, 281.1; 65/30.14, 116, 65/287, 30.13; 524/439
See application file for complete search history.

(56) References Cited

U.S. PATENT DOCUMENTS
3,880,638 A * 4/1975 Hafner et al. ............. 65/116
(Continued)

FOREIGN PATENT DOCUMENTS
| JP | 07-232935 A | 9/1995 |
| JP | 10-198954 | 7/1998 |
| JP | 2000-203888 | 7/2000 |
(Continued)

OTHER PUBLICATIONS
International Search Report in International Application No. PCT/JP2007/071709, dated Feb. 12, 2008, 2 pages.

*Primary Examiner* — Kevin M. Bernatz
*Assistant Examiner* — Louis Falasco
(74) *Attorney, Agent, or Firm* — Brinks, Hofer, Gilson & Lione (57) ABSTRACT

Provided is a method of manufacturing a glass substrate efficiently via prevention of foreign matter adhesion to a glass substrate as to chemical strengthening. Disclosed is a method of manufacturing a glass substrate for a recording medium possessing the step of conducting a chemical strengthening process by which a glass substrate held by a holding jig and the holding jig are immersed in a chemical strengthening solution, and $1^{st}$ alkali metal ion on a surface of the glass substrate is substituted by $2^{nd}$ alkali metal ion having a larger ion diameter than that of $1^{st}$ alkali metal ion contained in the chemical strengthening solution, wherein the holding jig possesses a member of material made of a metal comprising an alkali metal element, or a metal film comprising an alkali metal element to cover a surface of the holding jig from the very beginning of the chemical strengthening process.

8 Claims, 3 Drawing Sheets

U.S. PATENT DOCUMENTS

| | | | |
|---|---|---|---|
| 4,511,387 A * | 4/1985 | Kellar et al. | 65/287 |
| 4,883,523 A * | 11/1989 | Lee et al. | 65/30.14 |
| 5,266,356 A * | 11/1993 | Buchheit et al. | 427/372.2 |
| 6,069,197 A * | 5/2000 | Daech et al. | 524/439 |
| 6,119,483 A | 9/2000 | Takahashi et al. | |
| 2006/0199045 A1 * | 9/2006 | Kezuka et al. | 428/848.8 |

FOREIGN PATENT DOCUMENTS

| | | |
|---|---|---|
| JP | 2000-203888 A | 7/2000 |
| JP | 2003-048733 A | 2/2003 |
| JP | 2003-089551 A | 3/2003 |
| WO | WO 2008/068997 A1 | 6/2008 |

* cited by examiner

METHOD OF MANUFACTURING GLASS SUBSTRATE FOR RECORDING MEDIUM, GLASS SUBSTRATE FOR RECORDING MEDIUM, RECORDING MEDIUM AND HOLDING JIG

This application is a National Stage of International Application PCT/JP2007/071709 filed with Japanese Patent Office on Nov. 8, 2007.

TECHNICAL FIELD

The present invention relates to a method of manufacturing a glass substrate for a recording medium, a glass substrate for a recording medium, a recording medium and a holding jig.

BACKGROUND

In the past, aluminum alloys have been used for stationary type information devices such as desktop computers and servers, and glass substrates have been employed for portable type information devices such as notebook computers and mobile computers as recording medium substrates. Surface-smoothness of the substrate after polishing tends to be insufficient since not only aluminum alloys are deformable, but also their hardness is insufficient. Further, there was another problem such that a magnetic film was easy to be peeled off the substrate when a recording head was mechanically brought into contact with a magnetic disk. Thus, glass substrates exhibiting reduced deformation, excellent surface-smoothness and high mechanical strength are expected to be utilized from now on for stationary type information devices as well as portable type information devices, and also for other home appliances such as TV and so forth.

Glass substrates to be largely used in this way are subjected to a chemical strengthening treatment which has been utilized in the past in order to improve a mechanical strength so as to bear impact during use of the glass substrates installed in a magnetic disk drive. This chemical strengthening treatment is one by which glass substrates are immersed in a chemical strengthening solution stored in a chemical strengthening treatment tank, and alkali metal ions on the glass substrate surface are substituted by alkali metal ions each having a larger ion diameter than that of the foregoing alkali metal ion to generate compression strain, whereby mechanical strength is to be improved.

Further, higher recording density of a magnetic disk has been strongly demanded. In response to the foregoing, flying height of a recording head is also desired as low as possible. For this reason, higher flatness of the substrate and smaller surface roughness are further demanded. Therefore, there appears an important item to be solved such that not only polishing is conducted with a high degree of accuracy, but also protrusions caused by foreign matter attached onto the surface of the polished glass substrate are not to be generated.

In order to avoid the foreign matter attached onto the surface of the glass substrate, the following methods are cited, for example. (1) Sodium nitrate and potassium nitrate as the chemical strengthening salt are dissolved in ultrapure water, and particles (foreign matter) are removed with a filter for liquid to prepare a chemical strengthening solution (refer to Patent Document 1). Among those, removal of particles of iron including iron oxide and SUS. (2) A holding means to hold at least one of a wall surface and a glass substrate in a chemical strengthening tank is composed of a stainless alloy exhibiting corrosion resistance in the high heating temperature range of a chemical strengthening solution (refer to Patent Document 2).

(Patent Document 1) Japanese Patent O.P.I. Publication No. 2000-203888 (Page 8)
(Patent Document 2) Japanese Patent O.P.I. Publication No. 10-198954

DISCLOSURE OF THE INVENTION

Problems to be Solved by the Invention

In cases where foreign matter is generated from a holding jig immersed in a chemical strengthening tank in which a chemical strengthening solution is charged, and a holding jig immersed in a chemical strengthening solution while holding a glass substrate, even though particles are removed from the chemical strengthening solution charged in the chemical strengthening tank, no expectation concerning the effect of removing particles in advance is described in Patent Document 1. Removing particles with a filter for liquid in the case of replacement of a chemical strengthening solution, additional supply or the like is a troublesome chore. Use of a stainless alloy is described in Patent Document 2, and a martensitic stainless alloy or an austenitic stainless alloy is specifically cited. The martensitic stainless alloy is a Cr system alloy containing a large amount of iron, and the austenitic stainless alloy is a Cr—Ni system alloy. Accordingly, it is sufficiently expected that produced is a problem such that amounts of Fe, Cr and Ni of more than a little contained in a stainless alloy are mainly eluted to a chemical strengthening solution, and become foreign matter thereof via immersion in the chemical strengthening solution at high temperature, whereby the foreign matter in the chemical strengthening solution is attached on a glass substrate, and it can be sufficiently expected that produced is a problem such that an excellent glass substrate can not be efficiently obtained.

The present invention has been made on the basis of the above-described problem, it is an object of the present invention to provide a method of manufacturing a glass substrate efficiently via prevention of foreign matter adhesion to the glass substrate as to the chemical strengthening, a glass substrate for a recording medium, which is prepared by this method, a recording medium with a glass substrate for this recording medium, and a holding jig.

Means to Solve the Problems

The above-described problems are solved by the following structures.

(Structure 1) A method of manufacturing a glass substrate for a recording medium comprising the step of conducting a chemical strengthening process by which a glass substrate held by a holding jig and the holding jig are immersed in a chemical strengthening solution, and a $1^{st}$ alkali metal ion on a surface of the glass substrate is substituted by a $2^{nd}$ alkali metal ion having a larger ion diameter than that of the $1^{st}$ alkali metal ion contained in the chemical strengthening solution, wherein the holding jig comprises a member of material made of a metal comprising an alkali metal element.

(Structure 2) A method of manufacturing a glass substrate for a recording medium comprising the step of conducting a chemical strengthening process by which a glass substrate held by a holding jig and the holding jig are immersed in a chemical strengthening solution, and a $1^{st}$ alkali metal ion on a surface of the glass substrate is substituted by a $2^{nd}$ alkali metal ion having a larger ion diameter than that of the $1^{st}$ alkali metal ion contained in the chemical strengthening solution, wherein the holding jig comprises a metal film comprising an alkali metal element to cover a surface of the holding jig from the very beginning of use of the holding jig in the chemical strengthening process.

(Structure 3) The method of Structure 2, wherein the metal film is a metal film formed via immersion of the metal film in the chemical strengthening solution.

(Structure 4) The method of Structure 2 or 3, wherein the metal film has a thickness of 0.05-10 μm.

(Structure 5) A glass substrate for a recording medium comprising the glass substrate prepared by the method of any one of Structures 1-4.

(Structure 6) A recording medium comprising a magnetic film provided on a surface of the glass substrate for the recording medium of Structure 5.

(Structure 7) A holding jig to hold a glass substrate in a chemical strengthening process by which a glass substrate is immersed in a chemical strengthening solution, and a $1^{st}$ alkali metal ion on a surface of the glass substrate is substituted by a $2^{nd}$ alkali metal ion having a larger ion diameter than that of the $1^{st}$ alkali metal ion contained in the chemical strengthening solution, the holding jig comprising a member of material made of a metal comprising an alkali metal element.

(Structure 8) A holding jig to hold a glass substrate in a chemical strengthening process by which a glass substrate is immersed in a chemical strengthening solution, and a $1^{st}$ alkali metal ion on a surface of the glass substrate is substituted by a $2^{nd}$ alkali metal ion having a larger ion diameter than that of the $1^{st}$ alkali metal ion contained in the chemical strengthening solution, the holding jig comprising a metal film comprising an alkali metal element to cover a surface of the holding jig from the very beginning of use of the holding jig in the chemical strengthening process.

(Structure 9) The holding jig of Structure 8, wherein the metal film comprises a metal film formed by immersing the metal film in a chemical strengthening solution.

(Structure 10) The holding jig of Structure 8 or 9, wherein the metal film has a thickness of 0.05-10 μm.

Effect of the Invention

In the present invention, since the holding jig possesses a member of material made of a metal possessing an alkali metal element, or the holding jig possesses a metal film possessing an alkali metal element to cover a surface of the holding jig from the very beginning of use of the holding jig in the chemical strengthening process, the surface of the holding jig is to be made of a metal possessing an alkali metal element. From the foregoing, since a metal on the surface of the holding jig becomes the same alkali metal as a metal contained in a chemical strengthening solution, elution of material containing a metal to form a holding jig into a chemical strengthening solution is inhibited, whereby generation of foreign matter in the chemical strengthening solution is suppressed. Therefore, contamination caused by the foreign matter of the chemical strengthening solution can be inhibited, and deterioration of life of the chemical strengthening solution can also be inhibited. In addition, degradation of the holding jig is simultaneously inhibited, whereby durability is improved.

Accordingly, provided can be a method of manufacturing a glass substrate efficiently via prevention of foreign matter adhesion to a glass substrate as to the chemical strengthening, a glass substrate for a recording medium, which is prepared by this method, a recording medium with a glass substrate for this recording medium, and a holding jig.

EXPLANATION OF NUMERALS

1 Glass substrate for a recording medium
2 Magnetic film
D Magnetic disk
30 Holding jig
31 Glass substrate
32 Supporting pillar
34 V-groove
36 Connection member

DESCRIPTION OF THE PREFERRED EMBODIMENTS

The present invention will be described based on embodiments shown in figures, but the present invention is not limited thereto.

(Manufacturing Process)

Figure 1:
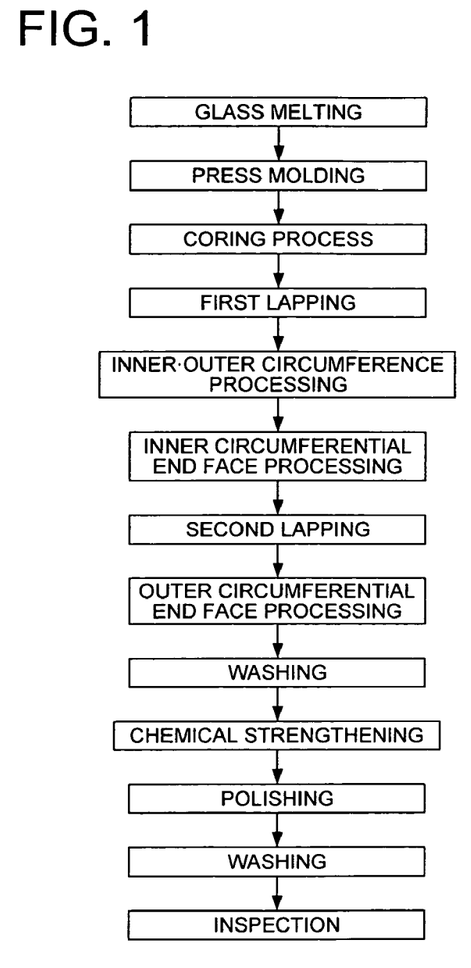
FIG. 1 is a flowchart showing an example of a process of manufacturing a glass substrate for a recording medium.

A method of manufacturing a glass substrate for a recording medium will be described. An example of a process of manufacturing a glass substrate for a recording medium is shown in FIG. 1 employing a flowchart. First, a glass material is melted (glass melting process), a melt glass is cast into a lower mold, and press molding is conducted with an upper mold to obtain a disk-shaped glass substrate precursor (press molding process). In addition, a disk-shaped glass substrate precursor may be prepared by cutting a sheet glass formed with a grinding stone employing a down-draw process or a float process, for example, depending on no press molding.

An opening is made in the center portion of the glass substrate precursor formed via press molding by using a core drill or the like, if desired (coring process). And, in the $1^{st}$ lapping process, both surfaces of a glass substrate are polished to make preparatory adjustment of entire shape of a glass substrate, that is, parallelism, flatness and thickness of the glass substrate.

Next, After outer circumferential end and inner circumferential end of a glass substrate are ground for chamfering, and outer diameter dimension and circularity, inner diameter dimension of a hole and concentricity between the glass substrate and the hole are finely adjusted (inner diameter·outer diameter processing process), fine scratches and so forth generated by polishing the inner circumferential end of the glass substrate are removed (inner circumferential end processing process).

Next, both surfaces of a glass substrate are polished again to make preparatory adjustment of parallelism, flatness and thickness of the glass substrate (the $2^{nd}$ lapping process). And, fine scratches and so forth generated by polishing the outer circumferential end of the glass substrate are removed (outer circumferential end processing process).

Next, after a glass substrate is washed, the glass substrate is immersed in the after-mentioned chemical strengthening solution to form a chemical strengthening layer on a glass substrate (chemical strengthening process). After this, the surface of a glass substrate is precisely polished to conduct a polishing process (polishing process). Then, washing and inspection are conducted, and a glass substrate for a recording medium as a product is completed. In addition, after conducting a chemical strengthening process to form a chemical strengthening layer, there is a polishing process to conduct polishing, but strength of the glass substrate before and after polishing remain almost unchanged.

Figure 2:
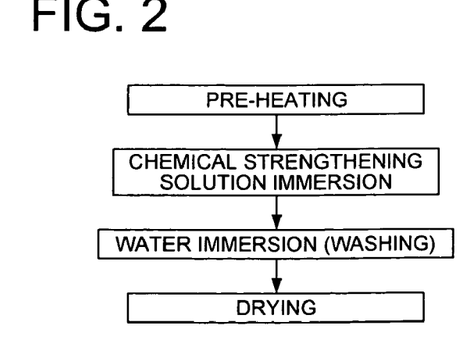
FIG. 2 is a flowchart showing a chemical strengthening process as to FIG. 1.

The above-described chemical strengthening process is shown as a flowchart in FIG. 2. The washed glass substrate is previously heated (pre-heating process), and subsequently, immersed in a chemical strengthening solution (chemical strengthening solution immersion process). The glass substrate removed from the chemical strengthening solution is washed with water (water immersion process), and dried (drying process).

In the chemical strengthening process, when conducting each of a series of processes from a pre-heating process to a drying process practically, these should be done as described below. First, a holding jig fitted with a plurality of glass substrates is prepared. Each of glass substrates together with a holding jig is introduced into a pre-heating furnace in order, immersed in a chemical strengthening tank, immersed in a washing tank, and introduced into a drying furnace to conduct a series of chemical strengthening treatments.

Figure 3A:
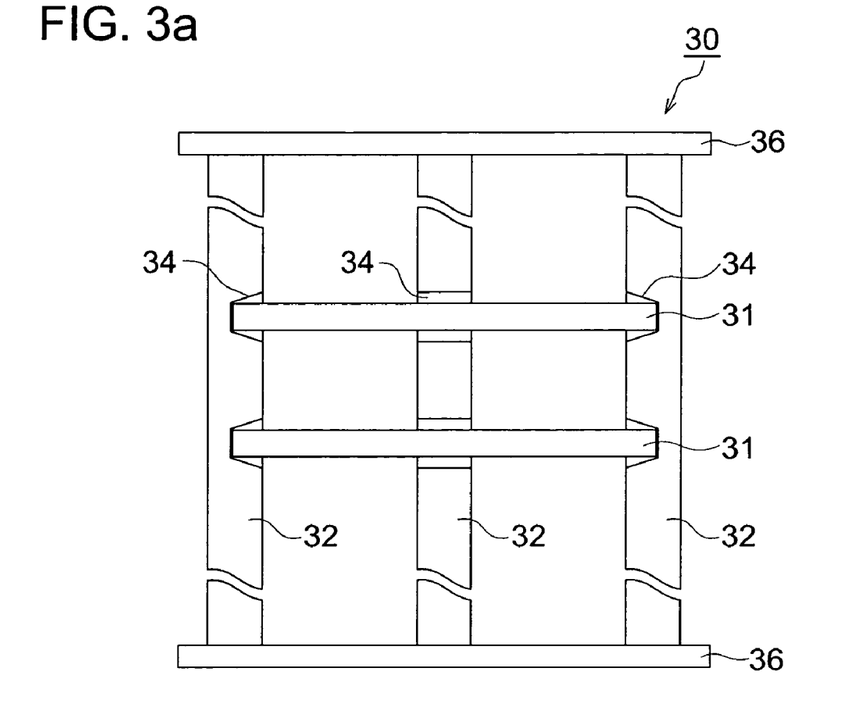
FIG. 3a is a top view of a holding jig as an example to hold and store a glass substrate.
Figure 3B:
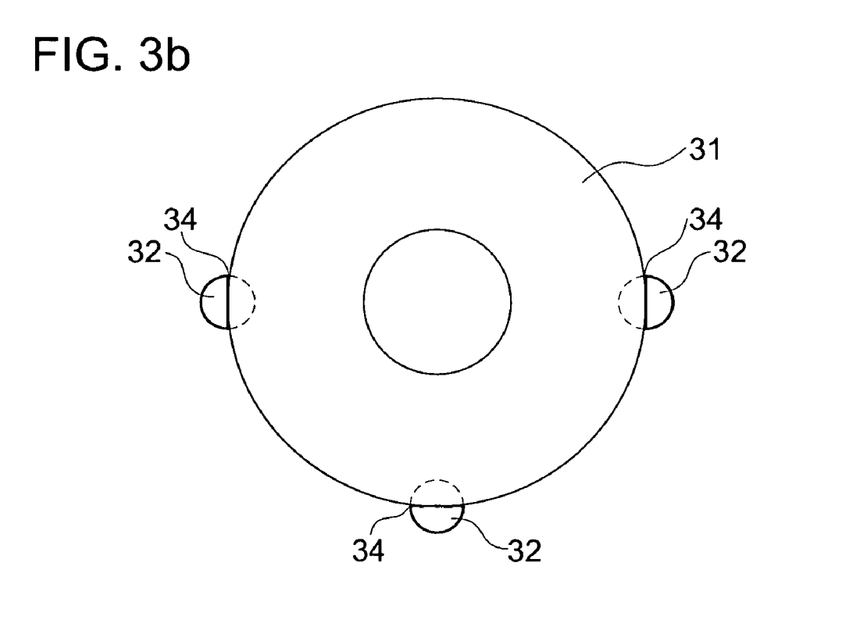
FIG. 3b is a cross sectional view as an example to hold and store a glass substrate.

An example of a holding jig to hold a plurality of glass substrates is shown in FIGS. 3a and 3b. FIG. 3a is a diagram viewing holding jig 30 from the side where glass substrate 31 is stored (top view). FIG. 3b is a cross sectional view of holding jig 30, and a situation where supporting pillar 32 in which V-groove 34 is provided holds glass substrate 31 is shown. Holding jig 30 in FIGS. 3a and 3b is produced by connecting 3 pillars 32 in which a few grooves 34 are formed at even intervals in the placing direction of glass substrate 31 to both the ends employing connection members 36. In the case of holding jig 30, a plurality of glass substrates are held via 3 point supporting by V-groove 34 for which each glass substrate is in the same plane of three supporting pillars 32, and a plurality of the substrates are placed in the extending direction of supporting pillar 32.

V-groove 34 preferably possesses a flat portion in such a way that the V-groove is brought into surface contact with the end of a glass substrate. Cracks caused by bite-off at the groove portion are difficult to be generated by the end of the glass substrate being brought into contact with the flat portion. The number of supporting pillars 32 are not limited to 3, but 3 supporting pillars are preferable in view of not much of portions brought into contact with the glass substrate, and stable holding.

Since the holding jig possesses a member of material made of a metal possessing an alkali metal element, or the holding jig possesses a metal film possessing an alkali metal element to cover a surface of the holding jig from the very beginning of use of the holding jig in the chemical strengthening process, the surface of the holding jig is to be made of a metal possessing an alkali metal element. When a glass substrate is subjected to chemical strengthening employing a holding jig made of such the metal, contamination caused by foreign matter of a chemical strengthening solution is inhibited, and degradation of life of the chemical strengthening solution can also be inhibited. Not only the surface of a holding jig but also the holding jig itself may be made of a metal possessing an alkali metal element. Further, degradation of the holding jig is inhibited, and durability is improved. The reason is not known, but the reason is presumably explained as described below. When a holding jig fitted with glass substrates is immersed in a chemical strengthening solution, chemical reaction of a metal constituting the holding jig with the chemical strengthening solution at high temperature is inhibited because of being alkali metal-to-alkali metal in comparison to different material-to-different material. Therefore, elution of material contained in metal constituting a holding jig into a chemical strengthening solution is inhibited. Since this elution is inhibited, generation of foreign matter caused by the eluted material in the chemical strengthening solution is inhibited. Accordingly, it is assumed that contamination caused by foreign matter of the chemical strengthening solution is inhibited, deterioration of life of the chemical strengthening solution is inhibited, and degradation of the holding jig is also inhibited.

Examples of the metal possessing an alkali metal element include a Li—Al alloy, a Li—Al—Ni alloy, a Li—Al—Mn alloy and so forth, and a holding jig can be produced employing the material. In cases where the member itself constituting the holding jig does not possess an alkali metal element, the following can be provided. First, metal such as tool steel, pure iron, pure aluminum, pure titanium, a titanium alloy, a magnesium alloy, zirconium, INCONEL HX (heat resistant special steel), Nickel, SUS304, SUS329, SUS410, SUS430 or the like is employed for a substrate, and a substrate made of any of these metals is processed into shape of a member constituting a holding jig. In the case of selection of the substrate, it is preferable that thermal deformation of the holding jig is to be avoided in consideration of a coefficient of thermal expansion. Of these substrates, SUS304 intrinsically exhibiting high corrosion resistance and excellent resistance to chemicals is more preferably employed for a substrate. Next, each member constituting a holding jig is processed employing the above-described substrate to complete an assembly thereof.

Further, after sufficiently washing a holding jig for which the assembly has been completed, a chemical strengthening solution for immersion actually during chemically strengthening a glass substrate, for example, $NaNO_3$ and $KNO_3$ are mixed in a weight ratio of 1:9, and the holding jig is immersed in the chemical strengthening solution heated to 360° C. In such the way, the chemical strengthening solution is brought into contact with a metal constituting each member constituting a holding jig, and an alkali metal salt is attached onto each member constituting the holding jig. After this, the holding jig is immersed in water, followed by washing and drying.

When the inventors observed the surface of a metal member constituting this holding jig, it was to be understood that an alkali metal salt dissolved easily in water was not attached in the crystalline state onto the surface of a metal member, and an alkali metal was firmly attached onto a metal member via certain reaction on the surface of the metal member to form a film. Hereinafter, forming of a metal film possessing an alkali metal element on the surface of the metal member is referred to as a coating treatment. In addition, in the case of the above-described, the coating treatment is conducted after completing the assembly of a holding jig, but the coating treatment may be conducted in the form of a component constituting a holding jig before assembling. Further, a chemical strengthening solution to conduct a coating treatment is to be more preferably a chemical strengthening solution actually to utilize a holding jig, but it may be a chemical strengthening solution containing an alkali metal ion, which is usable for chemical strengthening of a glass substrate, and the present invention is not limited thereto.

The coating treatment is preferably conducted at 20° C. higher temperature than temperature of the chemical strengthening solution employed actually in a chemical strengthening process. In the case of a temperature of less than 20° C., chemical reaction of the surface of a holding jig is accelerated during immersion with the chemical strengthening solution in the chemical strengthening process, and quality of the holding jig surface is gradually varied, whereby no chemical strengthening of the glass substrate can be stably conducted.

The metal film formed via a coating treatment preferably has a thickness of 0.05-10 μm. This film thickness can increase surface hardness of the holding jig in order to prevent dust and contamination generated by the holding jig, and can also inhibit deterioration thereof during immersion in a chemical strengthening solution. In the case of the thickness of less than 0.05 μm, no surface hardness is sufficiently increased, whereby no deterioration during immersion in a chemical strengthening solution can be inhibited. In the case of the thickness exceeding 10 μm, deformation of the jig is caused by stress of the metal film itself, and the jig is to be deteriorated.

In cases where each member itself constituting the holding jig is made of a metal possessing an alkali metal element, the above-described immersion in a chemical strengthening solution may not be conducted, but elution of material contained in the metal constituting the holding jig into the chemical strengthening solution can be more effectively inhibited by the foregoing immersion.

A holding jig is alternately immersed in water and a chemical strengthening solution repetitively in order to chemically strengthen a glass substrate employing the holding jig prepared as described above in the chemical strengthening process. When the inventors observed the holding jig which was subjected to the chemical strengthening processes repeated 20 times, increasing of thickness of an alkali metal and peeling off the alkali metal from the original metal surface were not observed. Because of this, thickness of an alkali metal on the surface of the holding jig is not increased though the repetitive chemical strengthening processes, but an appropriate thickness is presumably maintained. As a cause of the appropriate thickness, when thickness of an alkali metal firmly attached onto a metal member constituting a holding jig reaches a certain amount of thickness, it is assumed that the alkali metal is attached in the crystalline state of a salt, and the alkali metal salt in the crystalline state is removed in the subsequent water immersion process.

Accordingly, when a glass substrate is chemically strengthened employing a holding jig composed of a member of material made of a metal possessing an alkali metal element, or fitted with a metal film possessing an alkali metal element to cover a surface of the holding jig from the very beginning of use of the holding jig in the chemical strengthening process, elution of the metal material to contaminate the chemical strengthening solution through the holding jig can be inhibited. As the result, foreign matter attached onto a glass substrate can be suppressed to obtain an excellent glass substrate. Further, since elution of the metal material constituting a holding jig is suppressed durability of the holding jig is improved. Therefore, the exchange frequency of the holding jig can be reduced, whereby production efficiency of the glass substrate can be improved.

In addition, the holding jig for the glass substrate has been described here, but the present invention can be applied for the wall surface in a chemical strengthening tank to store a chemical strengthening solution, brought into contact with the chemical strengthening solution.

(Chemical Strengthening Solution Immersion Process)

In the chemical strengthening solution immersion process, a glass substrate is immersed in a chemical strengthening solution obtained by melting a chemical strengthening agent to ion-exchange an alkali metal ion on the surface layer of a glass substrate into an alkali metal ion in the chemical strengthening solution.

Examples of commonly known chemical strengthening agents include potassium nitrate ($KNO_3$), sodium nitrate ($NaNO_3$), potassium carbonate ($K_2CO_3$) and so forth. These are used singly or in combination with at least two kinds.

A predetermined amount of the chemical strengthening solution is charged in a chemical strengthening tank, and melted via heat to prepare a chemical strengthening solution. The heating temperature of the chemical strengthening solution is preferably 280-660° C., and more preferably 300-450° C. in view of ion-exchanging speed, Tg (glass transition temperature) of a glass substrate and so forth. Reaction speed of ion-exchange is not too slow, and shape of the glass substrate is not influenced by setting the temperature on the high temperature side (upper limit) to 300-450° C. lower than glass transition temperature Tg.

A duration to immerse a glass substrate in a chemical strengthening solution is preferably 0.1—several tens of hours. Heating is preferably conducted in advance before immersing the glass substrate in the chemical strengthening solution, as described in the present example. When heating the glass substrate in advance, temperature of the chemical strengthening solution is not excessively lowered during immersion in the chemical strengthening solution, whereby chemical strengthening can be conducted efficiently.

The thickness of the chemical strengthening layer formed by ion-exchanging an alkali metal ion on the surface layer of a glass substrate into an alkali metal ion in the chemical strengthening solution is preferably in the approximate range of 5-15 μm in relation to improved strength of the glass substrate and reduced time of a polishing process.

(Water Immersion Process)

After immersing a glass substrate in a chemical strengthening solution, the glass substrate is immersed in water in order to evenly remove the chemical strengthening solution on the surface of the glass substrate continuously. Since the chemical strengthening solution is not partially present on the glass substrate by immersing the glass substrate entirely in water, the chemical strengthening is not partially accelerated. Thus, since the chemical strengthening can be evenly conducted, strength can be evenly applied to the glass substrate.

The higher the temperature of water for immersion, a chemical strengthening solution and crystalline material of a salt constituting the chemical strengthening solution can be efficiently removed from the surface of a glass substrate in the shorter period of time. Such the water preferably has a temperature of 35-100° C. at atmospheric pressure. A duration of immersing a glass substrate in water is preferably at least one second. In the case of the duration of less than one second, a chemical strengthening solution remains on a glass substrate, resulting in strengthened unevenness since the chemical strengthening solution on the glass substrate can not be sufficiently removed. The upper limit of time for immersion in water is not specifically limited, and it may be arranged to be set in consideration of productivity.

In addition, in order to relax temperature difference in such a way that cracks and traces of cracks of a glass substrate are not generated in a water immersion process because of the temperature difference between water and a chemical strengthening solution, provided may be a cooling process to cool the glass substrate between the chemical strengthening solution immersion process and the water immersion process.

(Glass Substrate)

Chemically strengthened glass substrates are not specifically limited, but usable examples thereof include soda-lime glass containing silicon dioxide, sodium oxide or potassium oxide as a main component; aluminosilicate glass containing silicon dioxide, aluminum oxide or $R_2O$ (R=K, Na or Li) as a main component: boron silicate glass; lithium oxide—silicon dioxide based glass: lithium oxide—aluminum oxide—silicon dioxide based glass; and R'O— aluminum oxide—silicon dioxide based glass (R'=Mg, Ca, Sr or Ba), and zirconium oxide, titanium oxide or such may be added into a glass material thereof.

The size of the glass substrate is not also limited. The method of the present invention can be applied for 2.5 inch disks, 1.8 inch disks, 1 inch disks, 0.85 inch disks and disks smaller than the 0.85 inch disks, and also be applied for thin-type disks such as 2 mm thick disks, 1 mm thick disks, 0.63 mm thick disks and disks thinner than the 0.63 mm disks. Since the glass substrate of the present invention is strengthened by a chemical treatment method, the present invention is suitably applied for thin glass substrates.

As to the glass substrate provided in a chemical strengthening process, surface roughness of the main surface and surface roughness of the end face portion are not specifically limited, but the main surface of the glass substrate preferably has a surface roughness of 10 nm or less (Rmax; largest height) and another surface roughness of 1.0 nm or less (Ra; center line average surface roughness). Further, the end face portion of the glass substrate preferably has a surface roughness Rmax of 0.01-1 μm, and another surface roughness Ra of 0.001-0.8 μm. When the surface of the glass substrate having been subjected to a polishing treatment is chemically strengthened, a strengthening layer is possible to be evenly formed.

(Recording Medium)

Figure 4:
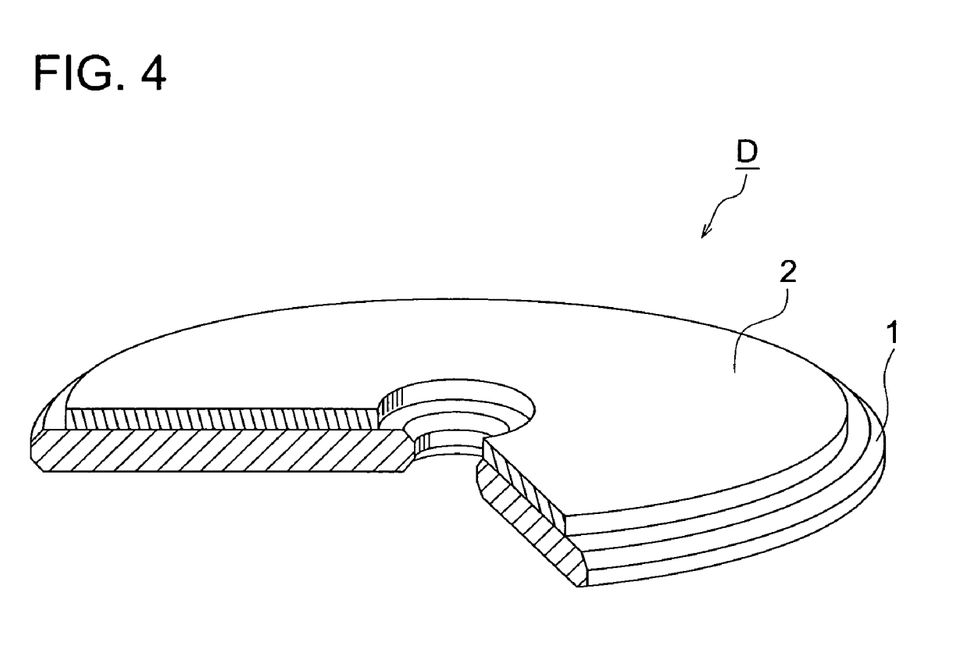
FIG. 4 is a oblique perspective view including a partial cross section of a magnetic disk.

Next, a recording medium fitted with a glass substrate for the recording medium, which has been described so far, will be described. Durability and high recording density are realized by utilizing the glass substrate for this recording medium. The recording medium will be described below, referring to a figure.

FIG. 4 shows an oblique perspective view of a magnetic disk. Magnetic disk M is one in which magnetic film 2 is directly formed on each of the surface of circular glass substrate 1 for a recording medium. Examples of the forming method of magnetic film 2 include a method of forming the magnetic film by spin-coating a thermosetting resin in which magnetic particles are dispersed on a substrate, a method of forming the magnetic film via sputtering, and a method of forming the magnetic film via electroless plating. The layer obtained via spin-coating has a thickness of roughly 0.3-1.2 μm, the layer obtained via sputtering has a thickness of roughly 0.04-0.08 μm, and the layer obtained via electroless plating has a thickness of roughly 0.05-0.1 μm. The film formation carried out via sputtering and electroless plating is preferable in view of thin film formation and high recording density.

Magnetic materials used for magnetic films are not specifically limited, and commonly known ones are usable, but Co exhibiting high magnetocrystalline anisotropy is taken as a base to acquire high coercive force, and the Co system alloy in which Ni and Cr are added is preferable in order to adjust residual magnetic flux density. Examples of the Co system alloy containing Co as a main component include CoPt, CoCr, CoNi, CoNiCr, CoCrTa, CoPtCr, CoNiPt, CoNiCrPt, CoNiCrTa, CoCrPtTa, CoCrPtB, CoCrPtSiO and so forth. A multilayer structure in which magnetic films are sandwiched and isolated by non-magnetic films (Cr, CrMo, CrV and so forth, for example) to make noise reduction may also be utilized. Examples thereof include CoPtCr/CrMo/CoPtCr, CoCrPtTa/CrMo/CoCrPtTa, and so forth. A granular structure in which magnetic particles made of Fe, Co, FeCo, CoNiPt or such are dispersed in a non-magnetic film formed from a ferrite system, an iron-rare earth system, $SiO_2$, BN or such, other than the above-described materials may also be utilized. Further, the magnetic film may also be utilized in any of an in-plane type recording method and a perpendicular type recording method.

A lubricant may be thinly coated on the magnetic film surface in order to improve sliding of a magnetic head. As the lubricant, provided is one in which a liquid lubricant such as perfluoropolyether (PFPE) is diluted with a freon based solvent.

An underlayer and a protective layer may also be provided, if desired. The underlayer provided for a magnetic disk is selected depending on the utilized magnetic film. The underlayer is made of at least one selected from the group consisting of Cr, Mo, Ta, Ti, W, V, B and Al as non-magnetic metals, and Ni. In the case of a magnetic film containing Co as a main component, they are preferably a single piece of Co and a Co alloy in view of improvement of magnetic properties. Further, the underlayer is not always a single layer, and a multilayer structure in which identical layers or non-identical layers are laminated may be allowed to be utilized. Examples of the underlayer having the multilayer structure which may be usable include Cr/Cr, Cr/CrMo, Cr/CrV, NiAl/Cr, NiAl/CrMo, NiAl/CrV and so forth.

Examples of the protective layer to prevent wear and corrosion of magnetic films include a Cr layer, a Cr alloy layer, a carbon layer, a carbon hydride layer a zirconia layer, a silica layer and so forth. These protective layers, together with underlayers, magnetic films and so forth can be continuously formed with an in-line type sputtering apparatus. the protective layer may be a single layer, or a multilayer structure in which identical layers or non-identical layers are laminated may be allowed to be utilized. In addition, a different kind of a protective layer may be formed on the above-described protective layer, or the above-described protective layer may be replaced by a different kind of a protective layer. For example, in place of the above-described protective layer, a silicon dioxide ($SiO_2$) layer may be formed by coating one, in which colloidal silica particles are dispersed in what tetraalkoxy silane is diluted with an alcohol based solvent, on a Cr layer, and further by baking it.

As one embodiment concerning a recording medium, the magnetic disk has been described as explained above, but the recording medium is not limited thereto, and glass substrates of the present invention are also usable for magnetooptical disks, optical disks and so forth.

EXAMPLE

Example 1

SUS304 was utilized for a substrate, and a component constituting holding jig 30 to hold a glass substrate shown in FIGS. 3a and 3b was prepared. Holding jig 30 was assembled employing this component. Next, assembled holding jig 30 was sufficiently washed with a cleaning agent for a metal component, and further pure water, employing an ultrasonic cleaner. A chemical strengthening agent in which $NaNO_3$ and $KNO_3$ were mixed in a weight ratio of 1:9 was subsequently charged in a chemical strengthening tank to immerse the holding jig in a chemical strengthening solution heated to 360° C., followed by washing via immersion in water, and drying.

Next, as a glass substrate to be chemically strengthened, prepared was an aluminosilicate glass substrate having an outer diameter of 65 mm, an inner diameter of 20 mm, and a thickness d of 0.635 mm, produced up to after the outer circumferential end face processing along with the manufacturing process in FIG. 1. These 25 substrates were stored in a holding jig to conduct chemical strengthening in accordance with FIG. 2.

After the 25 glass substrates stored in holding jig 30 were heated to 350° C. in advance, they were immersed in a chemical strengthening solution for 15 minutes. A chemical strengthening agent in which $NaNO_3$ and $KNO_3$ were mixed in a weight ratio of 1:9 was charged in a chemical strengthening tank to prepare a chemical strengthening solution having been heated to 330° C.

After immersing those in a chemical strengthening solution, the glass substrate accompanied with a holding jig was immersed in water at 60° C. for 5 minutes, followed by drying. After this, the glass substrate was removed from the holding jig to observe presence or absence of foreign matter on the glass substrate surface employing a microscope.

Example 2

An Al—Li alloy was utilized for a substrate, and a component constituting holding jig 30 to hold a glass substrate shown in FIGS. 3a and 3b was prepared. After this, similarly to Example 1, 25 glass substrates stored in holding jig 30 were chemically strengthened to observe presence or absence of foreign matter on the glass substrate surface employing a microscope.

Example 3

An Al—Li alloy was utilized for a substrate, and a component constituting holding jig 30 to hold a glass substrate shown in FIGS. 3a and 3b was prepared. Holding jig 30 was assembled employing this component. Next, assembled holding jig 30 was sufficiently washed with a cleaning agent for a metal component, and further pure water, employing an ultrasonic cleaner. After this, no immersion in a chemical strengthening solution, which was conducted in Example 1, was carried out.

After this, similarly to Example 1, 25 glass substrates stored in holding jig 30 were chemically strengthened to observe presence or absence of foreign matter on the glass substrate surface employing a microscope.

Comparative Example 1

AS a comparative example, 25 glass substrates stored in the holding jig were chemically strengthened to observe presence or absence of foreign matter on the glass substrate surface employing a microscope, similarly to Example 1, except that no chemical strengthening solution immersion was conducted after assembling holding jig 30.

CONCLUSION

An amount of foreign matter of a glass substrate chemically strengthened in each of Example 1, Example 2 and Example 3 was compared with an amount of foreign matter of a glass substrate in Comparative example 1, and the amount of foreign matter in Comparative example 1 was larger than that in any of Example 1, Example 2 and Example 3. When the amounts of foreign matter attached onto the glass substrate in Examples 1-3 were compared to each other, Example 2 exhibited the smallest amount of foreign matter, and Example 1 exhibited the same amount of foreign matter as that in Example 2.

The invention claimed is:

1. A method of manufacturing a glass substrate for a recording medium comprising:

conducting a first lapping process of polishing a first surface of a glass substrate and polishing a second surface of the glass substrate to adjust parallelism, flatness and thickness of the first surface and the second surface;

subsequent to completion of the first lapping process, conducting a second lapping process of polishing the first surface and polishing the second surface to finely adjust parallelism, flatness and thickness of the first surface and the second surface;

subsequent to completion of the second lapping process, conducting a chemical strengthening process by which the glass substrate, held by a holding jig, and the holding jig are immersed in a chemical strengthening solution, and a first alkali metal ion on the first surface of the glass substrate is substituted by a second alkali metal ion contained in the chemical strengthening solution and having a larger ion diameter than that of the first alkali metal ion, wherein the holding jig comprises a member of material, made of a metal comprising an alkali metal element; and subsequent to completion of the chemical strengthening process, conducting a polishing process by precisely polishing the first surface and precisely polishing the second surface to complete the glass substrate for use with a recording medium.

2. A method of manufacturing a glass substrate for a recording medium comprising:

conducting a first lapping process of polishing a first surface of a glass substrate and polishing a second surface of the glass substrate to adjust parallelism, flatness and thickness of the first surface and the second surface;

subsequent to completion of the first lapping process, conducting a second lapping process of polishing the first surface and polishing the second surface to finely adjust parallelism, flatness and thickness of the first surface and the second surface;

subsequent to completion of the second lapping process, conducting a chemical strengthening process by which the glass substrate, held by a holding jig, and the holding jig are immersed in a chemical strengthening solution, and a first alkali metal ion on the first surface of the glass substrate is substituted by a second alkali metal ion contained in the chemical strengthening solution and having a larger ion diameter than that of the first alkali metal ion, wherein the holding jig comprises a metal film comprising an alkali metal element to cover a surface of the holding jig from the very beginning of the chemical strengthening process; and subsequent to completion of the chemical strengthening process, conducting a polishing process by precisely polishing the first surface and precisely polishing the second surface to complete the glass substrate for use with a recording medium.

3. The method of claim 2, wherein the metal film is a metal film formed via immersion of the metal film in the chemical strengthening solution.

4. The method of claim 2, wherein the metal film has a thickness of 0.05-10 μm.

5. The method of claim 1, wherein when the holding jig and glass substrate are simultaneously immersed in the chemical strengthening solution the holding jig does not generate foreign matter that is deposited on the glass substrate in an amount that would affect the efficacy of the glass substrate when used as a recording medium.

6. The method of claim 5, wherein the substitution of the second alkali metal ion on the surface of the glass substrate inhibits elution of material of the holding jig into the chemical strengthening solution since the second alkali metal ions are present in the chemical strengthening solution, whereby generation of foreign matter in the chemical strengthening solution is suppressed.

7. The method of claim 2, wherein when the holding jig and glass substrate are simultaneously immersed in the chemical strengthening solution the holding jig does not generate foreign matter that is deposited on the glass substrate in an amount that would affect the efficacy of the glass substrate when used as a recording medium.

8. The method of claim 7, wherein the substitution of the second alkali metal ion on the surface of the glass substrate inhibits elution of material of the holding jig into the chemical strengthening solution since the second alkali metal ions are present in the chemical strengthening solution, whereby generation of foreign matter in the chemical strengthening solution is suppressed.

* * * * *